US012643758B2

(12) United States Patent
Mellin et al.

(10) Patent No.: US 12,643,758 B2
(45) Date of Patent: Jun. 2, 2026

(54) PRESSING ROLLER WITH A DEFORMABLE COUPLING STRUCTURE

(71) Applicant: The Procter & Gamble Company, Cincinnati, OH (US)

(72) Inventors: Gustav André Mellin, Amberly Village, OH (US); Pawel Marek Siczek, Liberty Township, OH (US); Brian Christopher Schwamberger, Fairfield Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 681 days.

(21) Appl. No.: 17/852,738

(22) Filed: Jun. 29, 2022

(65) Prior Publication Data

US 2023/0002181 A1 Jan. 5, 2023

Related U.S. Application Data

(60) Provisional application No. 63/217,324, filed on Jul. 1, 2021.

(51) Int. Cl.
| | |
|---|---|
| *B65H 20/02* | (2006.01) |
| *B32B 1/00* | (2024.01) |
| *B32B 3/12* | (2006.01) |
| *B32B 15/08* | (2006.01) |
| *B32B 37/00* | (2006.01) |

(52) U.S. Cl.
CPC .............. *B65H 20/02* (2013.01); *B32B 1/00* (2013.01); *B32B 3/12* (2013.01); *B32B 15/08* (2013.01); *B32B 37/0053* (2013.01); *B32B 2305/024* (2013.01); *B32B 2311/005* (2013.01); *B32B 2311/18* (2013.01); *B32B*

*2375/00* (2013.01); *B65H 2404/18* (2013.01); *B65H 2404/185* (2013.01)

(58) Field of Classification Search
CPC ........ B32B 37/0053; B65H 2404/1122; B65H 2404/11221; B65H 2404/185; B31F 1/07; B31F 2201/07; B31F 2201/0715; B31F 2201/0725; B31F 2201/0728; B31F 2201/073
See application file for complete search history.

(56) References Cited

U.S. PATENT DOCUMENTS

| | | | | |
|---|---|---|---|---|
| 4,158,128 | A | 6/1979 | Evdokimov | |
| 5,257,967 | A | 11/1993 | Gysin | |
| 7,976,664 | B2 | 7/2011 | Lasson | |
| 10,737,456 | B2 | 8/2020 | Biagiotti | |
| 2008/0200320 | A1* | 8/2008 | Buckner | ................... B31F 1/07 |
| | | | | 492/53 |
| 2017/0225916 | A1* | 8/2017 | Tsuda | ................... B65H 3/5261 |
| 2019/0160777 | A1* | 5/2019 | Biagiotti | .............. B32B 29/005 |

FOREIGN PATENT DOCUMENTS

| | | |
|---|---|---|
| EP | 2803610 | 11/2014 |
| GB | 1205097 | 9/1970 |

* cited by examiner

*Primary Examiner* — Carson Gross
(74) *Attorney, Agent, or Firm* — Richard L. Alexander

(57) ABSTRACT

A pressing roller is provided including an inner core and a roller cover structure where the roller cover structure is divided into segments. Each roller cover segment may have a rigid inner ring, an elastomeric outer ring, and a deformable coupling structure located between the inner ring and the outer ring. The deformable coupling structure may be formed from a shape memory alloy, a carbon fiber composite, or nylon.

18 Claims, 6 Drawing Sheets

132B

132

132A

222A

222

122

124

132C

132

133

222

122

332C

336

334

332

332A

L2

L1

L3

132

133

222

222

122

PRESSING ROLLER WITH A DEFORMABLE COUPLING STRUCTURE

CROSS REFERENCE TO RELATED APPLICATION

This application claims the benefit of U.S. Provisional Application No. 63/217,324, filed Jul. 1, 2021, the substance of which is incorporated herein by reference.

FIELD OF THE DISCLOSURE

The subject matter of the present disclosure relates to a pressing roller used during the production of tissue or towel paper.

BACKGROUND

A typical process used during the production of tissue or towel paper involves embossing at least one layer of a web material using two rollers and bonding together at least two web layers of material using two rollers. The duration of time when the layer or layers are being compressed together is referred to as a nip time. Desire for a faster overall production time has led to a decreased nip time, which has led to a degradation of product quality. In an effort to increase nip time while maintaining a fast production time, manufacturers have begun using a system that includes one deformable roller and one rigid roller. The deformable roller conforms to the surface of the rigid roller to increase the nip time.

SUMMARY

The present disclosure provides a pressing roller, suitable for use in processing web material, comprising an inner core and a roller cover structure. The roller cover structure may define an outer surface adapted to mate with an outer surface of a mating roller to define a nip to receive one or more plies of web material. The roller cover structure may comprise a plurality of roller cover segments. Each roller cover segment may comprise an inner ring, an outer ring, and a deformable coupling structure located between the inner ring and the outer ring. The deformable coupling structure may be formed from a shape memory alloy (SMA), a carbon fiber composite, or nylon. The inner ring may be formed from a rigid material and the outer ring may be formed from an elastomeric material or other polymeric material.

In one embodiment, the deformable coupling structure may comprise a plurality of ribs located between the inner and outer rings. In other embodiments, the deformable coupling structure may comprise a lattice structure such as a honeycomb structure, or a randomly shaped lattice structure.

DETAILED DESCRIPTION

In the following detailed description of the preferred embodiments, reference is made to the accompanying drawings that form a part hereof, and in which is shown by way of illustration, and not by way of limitation, specific preferred embodiments of the present disclosure. It is to be understood that other embodiments may be utilized and that changes may be made without departing from the spirit and scope of the present disclosure.

Definition of Terms

The term "fiber structure ply" means a ply of web material formed from non-woven, paper or other fiber structures.

The term "compressible" as used herein means with respect to an outer ring of a pressing roller that the outer ring is compressible in a radial direction, i.e., the outer ring's thickness T is compressible. For example, an outer surface of the outer ring may deform radially inwardly a greater extent than an inner surface of the outer ring such that the outer surface deforms radially inward toward the inner surface, see FIGS. 3A and 3B.

The term "deformable" as used herein means with respect to an outer ring of a pressing roller that the outer ring is deformable inwardly, i.e., both the inner and outer surfaces of the outer ring may deform inwardly together, so as to conform to the shape of an adjacent mating roller.

Figure 1:
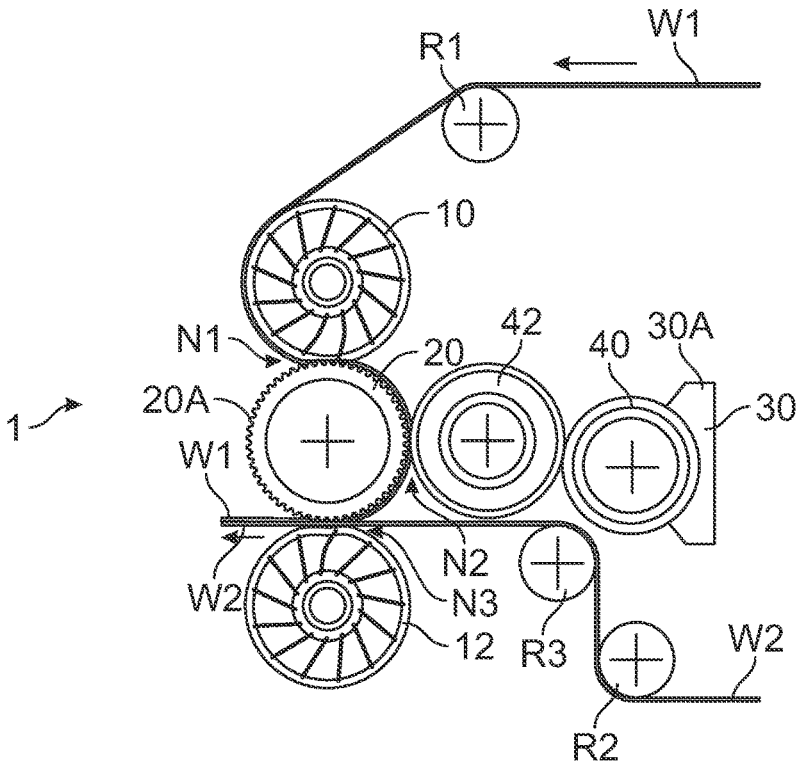
FIG. 1 is a schematic representation of an embossing system including first and second pressing rollers of the present disclosure.

Referring now to the drawings, particularly to FIG. 1, a system 1 is shown comprising first, second and third guide rollers R1, R2 and R3, first and second pressing rollers 10 and 12, an embossing roller 20 (also referred to herein as a "mating roller"), an adhesive reservoir 30, a transfer roller 40 and an applicator roller 42. The first, second and third guide roller R1, R2 and R3 may be driven or non-driven so as to move freely. The embossing roller 20 may be driven by a drive system (not shown) so as to rotate. The first and second pressing rollers 10 and 12 may be caused to rotate by engagement with the embossing roller 20. The applicator roller 42 and the transfer roller 40 may be driven to rotate.

First and second endless plies of web material W1 and W2 are provided to the system 1 in the embodiment illustrated in FIG. 1. The plies of web material W1 and W2 may comprise fiber structure plies, such as non-woven plies, paper plies or like fiber structure plies. The first ply of web material W1 passes over the first guide roller R1, engages the first pressing roller 10 and then passes through a first nip N1 defined between the first pressing roller 10 and the embossing roller 20. As the first ply of web material W1 moves through the first nip N1, it is embossed by an embossing pattern formed on an outer surface 20A of the embossing roller 20. The first ply of web material W1 continues to move with the embossing roller 20 and passes through a second nip N2 defined between the embossing roller 20 and the applicator roller 42, where a first side of the first ply of web material W1 is coated with an adhesive 30A by the applicator roller 42. The applicator roller 42 receives the adhesive 30A from the transfer roller 40, which extends into the adhesive reservoir 30 containing the adhesive 30A. The first ply of web material W1 continues through a third nip N3 defined between the embossing roller 20 and the second pressing roller 12.

The second ply of web material W2 passes over the second and third guide rollers R2 and R3 and into the third nip N3, such that the second ply W2 moves generally simultaneously with the first ply W1 through the third nip N3. As the second ply of web material W2 enters the third nip N3, it engages with the first side of the first ply of web material W1 coated with adhesive. While in the third nip N3, the first and second plies of web material W1 and W2 are pressed together by the embossing roller 20 and the second pressing roller 12, which functions as a marrying roller. The first and second plies of web material W1 and W2 exit the third nip N3 joined together as a two-ply web paper product.

Figure 2:
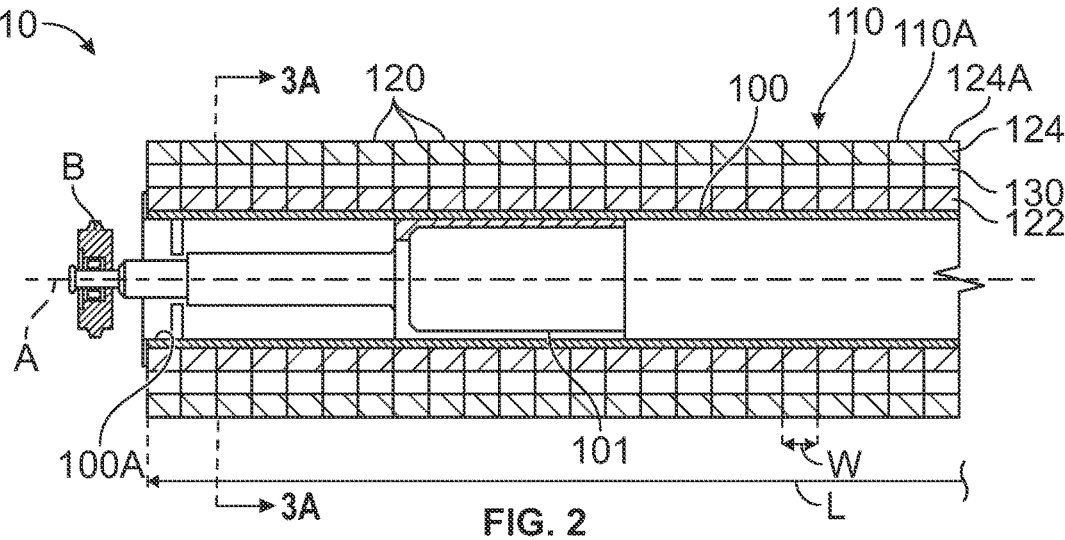
FIG. 2 depicts a cross sectional view of the first pressing roller of FIG. 1.

The first pressing roller 10 includes an inner core 100 and a roller cover structure 110, see FIG. 2. The roller cover structure 110 is adapted to be mounted on the inner core 100 for rotation with the inner core 100. As discussed in further detail below, the roller cover structure 110 defines an outer surface 110A to mate with the embossing roller 20. The inner core 100 may have a tubular configuration for receiving a shaft (not shown), such that the core 100 is joined to the shaft for rotation with the shaft. In the embodiment of FIG. 2, the inner core 100 receives at each of its opposing ends 100A a corresponding shaft-like mounting member 101. Each of the two mounting members 101 is rotatably mounted in a bearing B, so as to allow the pressing roller 10 to rotate about an axis A.

The pressing roller 10 may have any length L, such as from 60 inches to 240 inches and preferably 110 inches. The roller cover structure 110 runs or extends the entire length of the pressing roller 10 and may be defined by a plurality of roller cover segments 120 having equal widths W, see FIG. 2. If, for example, the pressing roller 10 has a length L of 110 inches, the roller cover structure 110 may be defined by 110 roller cover segments 120, with each roller cover segment 120 having a width W of 1 inch. In this example, the inner core 100 may comprise a single unitary structure having a length of about 110 inches. The width W of each roller cover segment 120 may vary from 0.5 inch to 3.0 inches.

Figure 3A:
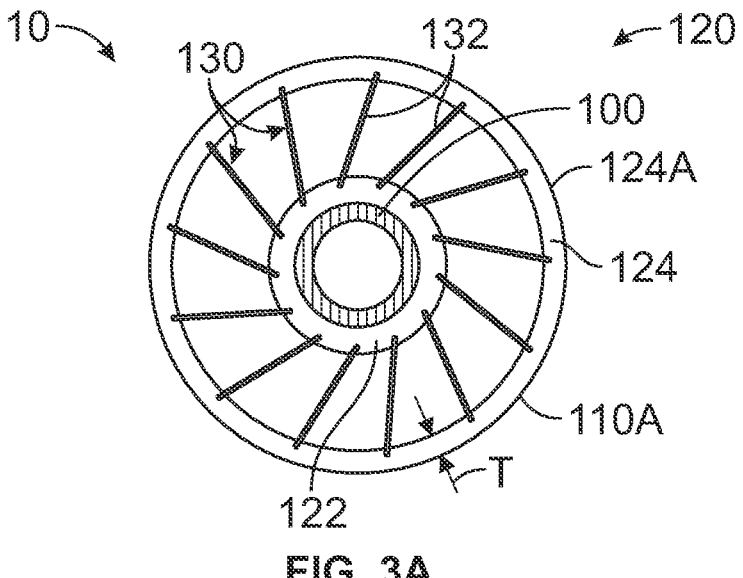
FIG. 3A is a view of a roller cover segment of a roller cover structure mounted on an inner core taken along view line 3A-3A in FIG. 2.

Each roller cover segment 120 comprises an inner ring 122 adapted to be fitted on the inner core 100 and may be secured to the inner core 100, such as by a friction fit, adhesive or a fastener, see FIGS. 2 and 3A. The inner ring 122 may be formed from a rigid material, such as steel, aluminum, a fiber composite or a hard polymeric material. Each roller cover segment 120 may further comprise an outer ring 124, having an outer surface 124A forming a portion or section of the outer surface 110A of the roller cover structure 110. The outer ring 124, in accordance with one embodiment, may be formed, such as by molding, from a material, which is both compressible and deformable, examples of which include compressible and deformable polymeric materials such as compressible and deformable elastomeric materials including polyurethane, a rubber or an elastomer, wherein the rubber/elastomer may have a hardness falling within the range of 50-200 Pusey and Jones hardness (P&J). One example of a compressible and deformable polymeric material is one that is commercially available from Valley Roller, of the Maxcess Group, under the product designation Val-Coat®. When the outer ring 124 is formed from a material that is compressible, the outer ring 124 is compressible in a radial direction, i.e., the outer ring's thickness T is compressible, see FIGS. 3A and 3B. When the outer ring 124 is formed from a material that is also deformable, the outer ring 124 is capable of deforming inwardly so to conform to the shape of the embossing roller 20.

Figure 3B:
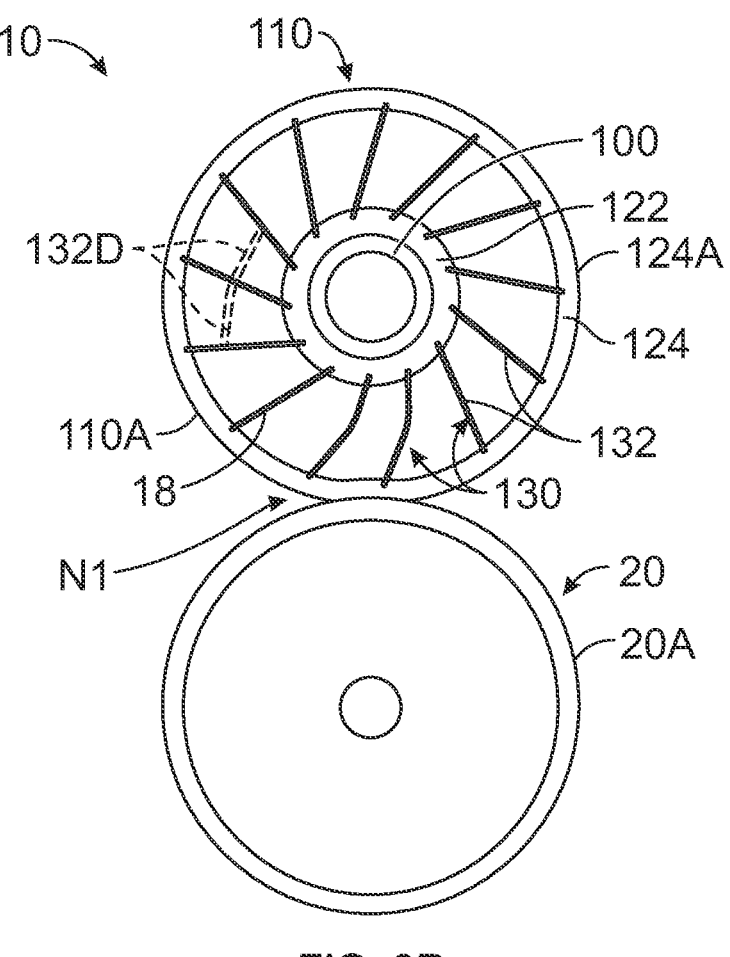
FIG. 3B is a side view of the interaction between a mating roller and the first pressing roller of FIG. 1.

Each roller cover segment 120 may still further comprise a deformable coupling structure 130 located between the inner ring 122 and the outer ring 124, see FIGS. 2, 3A and 3B. In the illustrated embodiments, the deformable coupling structure 130 may be formed from a super elastic material, such as, for example, a shape memory alloy (SMA). The SMA may comprise a nickel titanium alloy or an indium titanium alloy. The deformable coupling structure 130 may also be formed from a carbon fiber composite, formed from carbon fibers in an epoxy resin, or the structure 130 may be formed from a nylon. The deformable coupling structure 130 may have various geometries, which are discussed in detail below. It is believed that a deformable coupling structure 130, when formed from a super elastic material such as SMA, a carbon fiber composite or nylon, may be capable of a high number of repeated deformation cycles as the first pressing roller 10 is deformed in the first nip N1 without experiencing excessive fatigue which may change shape and related characteristics of the coupling structure 130. Hence, it is believed that the first pressing roller's fatigue resistance will be improved such that use of the pressing roller 10 in combination with a mating roller may be extended before needing replacement.

As noted above, the first ply of web material W1 passes through the first nip N1 defined between the first pressing roller 10 and the embossing roller 20. Because the outer ring 124 of the first pressing roller 10 may be formed from a material, which is both compressible and deformable, the outer ring 124 compresses radially in the first nip N1 so as to conform to the embossing pattern formed on the embossing roller 20 to allow for a full or complete embossing of the first ply of web material W1 by the embossing roller 20. Further, because the outer ring 124 is formed from a material which is both compressible and deformable, and the outer ring 124 is supported on its inner surface by the deformable coupling structure 130, a portion of the outer ring 124 in engagement with the embossing roller 20 is capable of deforming to the shape of the embossing roller 20 to increase the length of the first nip N1 between the first pressing roller 10 and embossing roller 20, thereby increasing the time that the first ply of web material W1 is compressed in the first nip N1, i.e., the first nip N1 is extended, so as to allow for a more complete embossing of the first ply W1 by the embossing roller 20 while in the first nip N1.

Figures 4A, 4B, 4C, 4D, 4E:
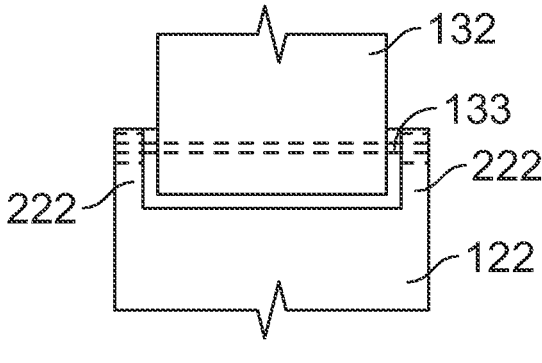
FIGS. 4A-4D illustrate a rib forming part of the deformable coupling structure having an inner end configured to receive a pin to couple the rib to the inner ring and also illustrating an outer end of the rib located within a molded outer ring.
FIG. 4E illustrates a further embodiment of a rib forming part of a deformable coupling structure.

The deformable coupling structure 130, formed in accordance with embodiments of the present disclosure, comprises a plurality of ribs 132, where each rib 132 may be coupled to the inner ring 122 and the outer ring 124, see FIGS. 3A, 3B and 4C. In the embodiment illustrated in FIGS. 4A-4D, each rib 132 may be formed with a curled first end 132A defining a bore 132B for receiving a fastener such as a pin or bolt 133. For example, when the deformable coupling structure 130 is formed from an SMA, the first end 132A of each rib 132 may be mechanically deformed to form the curl on the first end 132A. If the deformable coupling structure 130 is formed from a carbon fiber composite or nylon, the ribs 132 may be molded such that the first ends 132A have a curled shape with a bore 132B. The inner ring 122 may be molded with pairs of axially spaced apart connecting members 222 provided with bores 222A through which a corresponding pin 133 extends, see FIG. 4D. Pairs of the connecting members 222 may be equally spaced apart circumferentially about the outer periphery of the inner ring 122. A rib 132 may be positioned between a corresponding pair of connecting members 222. A pin 133 or other fastener may be inserted into the bore 132B of the rib first end 132A and the bores 222A of the corresponding connecting members 222 to join the rib 132 to the inner ring 122, see FIGS. 4C and 4D.

Each rib 132 may also include a second end 132C, which extends into the outer ring 124. During a molding process for forming the outer ring 124, each second end 132C of the ribs 132 may be placed in the mold before the polymeric material is injected into the mold. The second ends 132C may be deformed as shown in FIG. 4C to increase the surface area embedded within the molded outer ring 124 to improve the coupling between the ribs 132 and the outer ring 124. It is further contemplated that the outer ring 124 may be formed with a plurality of slots or recesses (not shown) on its inner surface, which slots are circumferentially spaced apart. A second end 132C of each rib may be inserted into a corresponding slot within the outer ring 124 after the outer ring 124 is formed and may be retained in the outer ring slot via friction, a fastener or adhesive.

Figure 5:
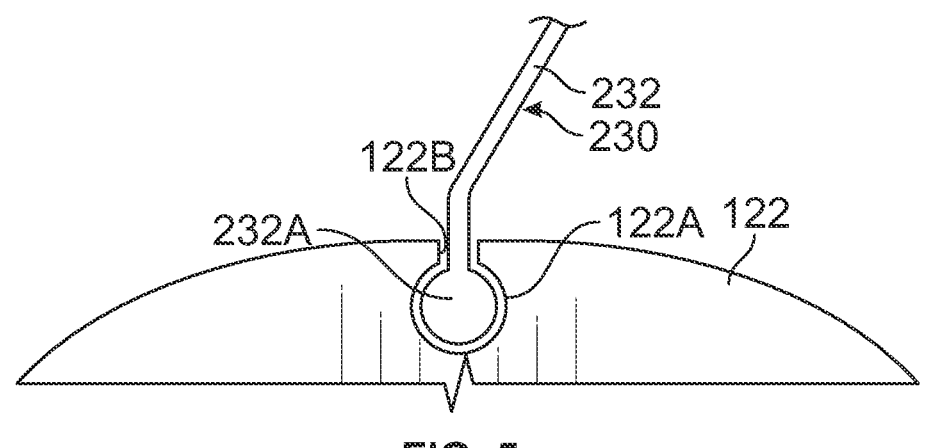
FIG. 5 illustrates an interlocking joint for coupling the inner ring and a rib of the deformable coupling structure together.

In FIG. 5, a further embodiment of a deformable coupling structure 230 is illustrated where the coupling structure 230 comprises a plurality of ribs 232 coupled to the inner and outer rings 122 and 124. Each rib 232 may comprise an enlarged first end 232A. For example, when the deformable coupling structure 230 is formed from an SMA, the first end 232A of each rib 232 may be mechanically deformed to form a curl on the first end 232A, which curl defines the enlarged first end 232A. If the deformable coupling structure 230 is formed from a carbon fiber composite or nylon, the ribs 232 may be molded such that the first ends have an enlarged first end 232A. The inner ring 122 may be molded to include axially extending grooves 122A, each sized to receive a corresponding rib first end 232A. The grooves 122A may be equally spaced apart circumferentially about the outer periphery of the inner ring 122. An enlarged first end 232A of each rib 232 is inserted into a corresponding one of the grooves 122A so as to secure the rib 232 to the inner ring 122. The grooves 122A may have a narrow exit 122B to prevent the enlarged first ends 232A from radially exiting the grooves 122A. The grooves 122A and the rib first ends 232A define interlocking joints.

The number of ribs defining the deformable coupling structure may be varied. As the number of ribs is increased, the deformable coupling structure may become more rigid, while as the number of ribs in decreased, the deformable coupling structure may become less rigid and more deformable.

The geometry of the deformable coupling structure can also be changed by varying the thickness of each rib. Increasing rib thickness may make the deformable coupling structure more rigid, while thinner ribs may make the deformable coupling structure less rigid.

Each rib can have a thickness that varies along its length, where the length is defined as the distance from where the rib is coupled to the inner ring 122 to where the rib is coupled to the outer ring 124. For example, in the embodiment illustrated in FIG. 4E, the thickness of the rib 332 is greater starting at its first end 332A and becomes thinner at a location partway between the first end 332A and the second end 332C. In this embodiment, the rib's thickness may be varied by staggering layers of SMA of different lengths. First and second outer layers $L_1$ and $L_2$ of SMA are positioned on opposite sides of a third layer $L_3$ of SMA. The first and second layers $L_1$ and $L_2$ of SMA extend from the first end 332A of the rib 332 and end approximately at a middle location between the first and second ends 332A and 332C. The third layer $L_3$ extends the full distance from the first end 332A to the third end 332C. The first, second and third layers $L_1$-$L_3$ may be joined using fasteners 334, such as pins or bolts, and/or an adhesive 336.

In a further embodiment, the deformable coupling structure comprises main ribs and sub-ribs. For example, the ribs 132 illustrated in FIG. 3B may define main ribs and ribs 132D shown in phantom may define sub-ribs. When the deformable coupling structure is formed from an SMA, the sub-ribs 132D may be joined to the main ribs 132 using either adhesive or mechanical fasteners.

FIG. 3B depicts the interaction between the first pressing roller 10 and the embossing roller 20. During the interaction, the outer surface 110A of the roller cover structure 110 engages or mates with the outer surface 20A of the embossing roller 20 to define the first nip N1, which receives the first ply of web material W1. Where the outer surface 110A of the roller cover structure 110 and the outer surface 20A of the embossing roller 20 engage, the roller cover structure 110 compresses to conform to the embossing pattern on the embossing roller 20. The roller cover structure also deforms slightly inward to conform to the outer surface 20A of the embossing roller 20. The outer surface 20A of the embossing roller 20 is much more rigid than the outer surface 110A of the roller cover structure 110 such that the embossing roller outer surface 20A essentially does not deform in the first nip N1. The deformation of the roller cover structure 110 at and near the first nip N1 increases the nip time, i.e., the time that a given point on the first ply of web material W1 is engaged by both the pressing and embossing rollers 10 and 20, which leads to an improve embossing of the first ply W1. The deformable coupling structure 17 of each roller cover segment 120, which supports its corresponding outer ring 124, along with the deformable material from which the outer ring 124 is formed, allows the roller cover structure 11 at and near the first nip N1 to deform radially inward so as to create the increased nip time.

Figure 6:
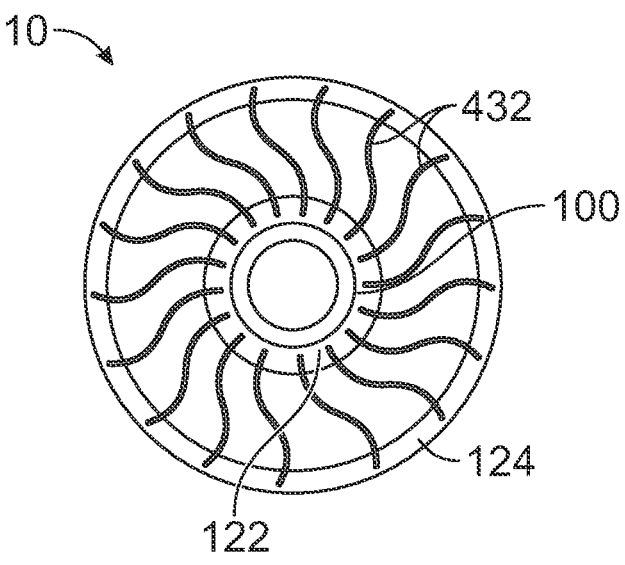
FIGS. 6-9 illustrate additional embodiments of the deformable coupling structure.
Figure 7:
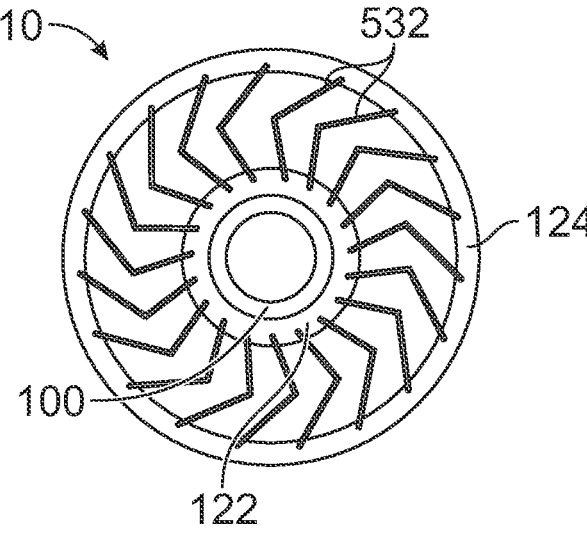

In the embodiments of FIGS. 3A, 3B, 4A-4E, 5, the ribs 132, 232 and 332 are generally linear along all or a substantial portion of their lengths. In the embodiment illustrated in FIG. 6, the ribs 432 have a curved profile along their lengths. In the embodiment illustrated in FIG. 7, the ribs 532 have an angled profile along their lengths. The ribs 432 and 532 may be formed from any of the materials set out above from which the ribs 132, 232 and 332 are formed and the ribs 432 and 532 may be joined to the inner and outer rings 122 and 124 in any manner discussed above in which the ribs 132, 232 and 332 are coupled to the inner and outer rings 122 and 124. It is noted that the shape/geometry of the ribs or other structures defining the deformable coupling structure may be designed so as to vary the nip profile between the embossing roller and a pressing roller. For example, based on the shape/geometry of the deformable coupling structure, the nip profile may extend a greater extend to one side or another of an axis that passes through center axes of both the embossing and pressing rollers and the nip, i.e., the nip may extend a greater distance in a direction toward an entrance or exit portion of the nip.

Figure 8:
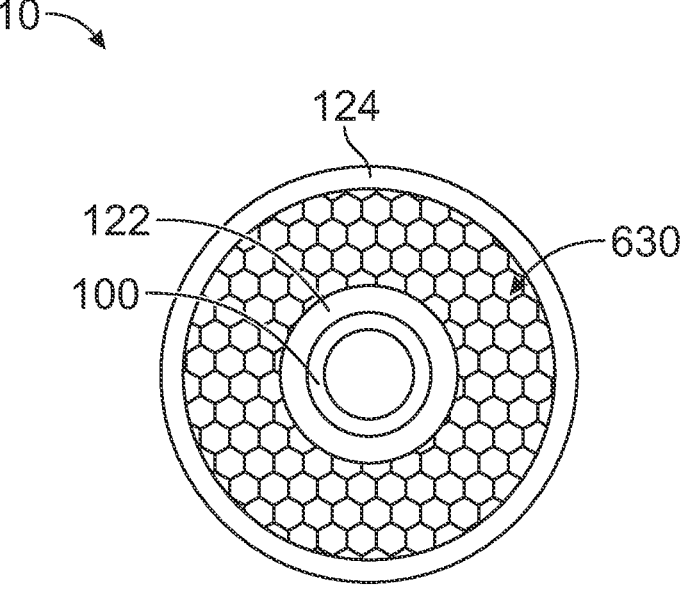
Figure 9:
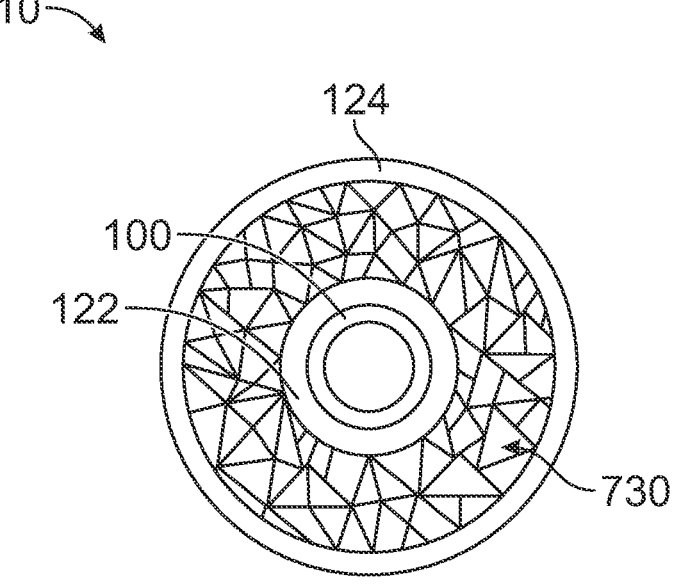

As shown in FIGS. 8 and 9, the deformable coupling structure may comprise a lattice structure. In FIG. 8, the deformable coupling structure comprises a honeycomb lattice structure 630. In FIG. 9, the deformable coupling structure comprises a randomly shaped lattice structure 730. Both lattice structures 630 and 730 may be formed by deforming single sheets of the super elastic material to create separate layers, which layers may or may not be coupled together. If the separate layers are coupled together, they may be coupled via adhesive or fasteners such as pins or bolts. If the layers are not coupled together, then the layers may be positioned adjacent to one another, i.e., stacked on top of one another in a radial direction, in the space between the inner and outer rings 122 and 124 to form the lattice structure.

Figure 10:
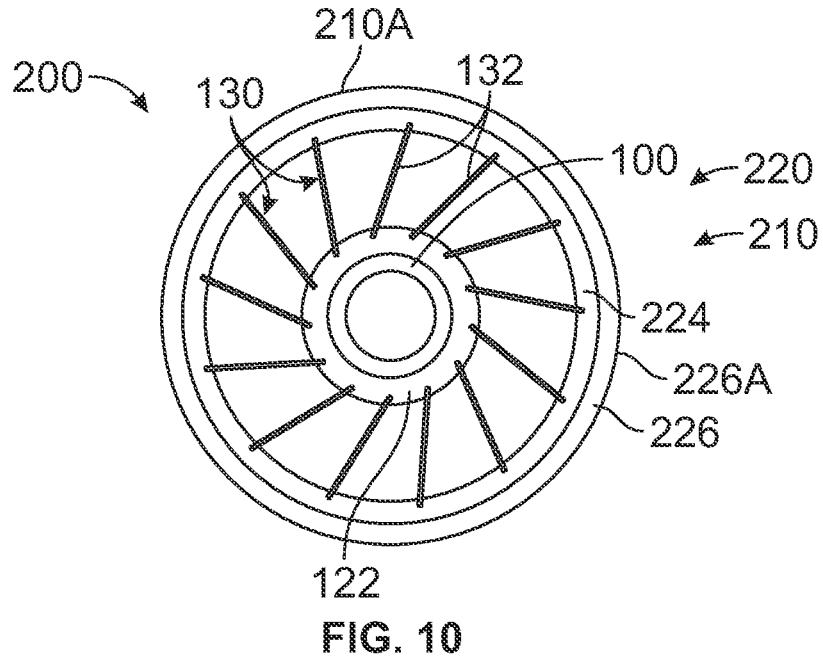
FIG. 10 illustrates a further embodiment of a first pressing roller.

A first pressing roller 200 constructed in accordance with a further embodiment is illustrated in FIG. 10, where elements in the first pressing roller 200 which are the same as elements in the first pressing roller 10 in FIGS. 1 and 3A are referenced with the same reference numerals. The first pressing roller 200 includes an inner core 100 and a roller cover structure 210. The roller cover structure 210 is adapted to be mounted on the inner core 100 for rotation with the inner core 100. The roller cover structure 210 may be defined by a plurality of roller cover segments 220.

Each roller cover segment 220 may comprise an inner ring 122 adapted to be fitted on the inner core 100 and may be secured to the inner core 100, such as by a friction fit, adhesive or a fastener. The inner ring 122 may be formed from a rigid material, such as steel, aluminum, a fiber composite or a hard polymeric material. Each roller cover segment 220 may further comprise a first outer ring 224 and a second outer ring 226. An outer surface 226A of the second outer ring 226 may form a portion or section of the outer surface 210A of the roller cover structure 210. The first outer ring 224 may be formed from a material, which is deformable, examples of which include deformable metals such as steel or aluminum or deformable polymeric materials, such as deformable elastomeric materials including polyurethane, nylon, a rubber or an elastomer, wherein the rubber/elastomer may have a hardness falling within the range of 0-50 Pusey and Jones hardness (P&J). The second outer ring 226 may be formed, such as by molding, from a material, which is compressible, examples of which include compressible polymeric materials, such as compressible elastomeric materials including polyurethane, a rubber or an elastomer, wherein the rubber/elastomer may have a hardness falling within the range of 50-200 Pusey and Jones hardness (P&J). One example of a compressible and deformable polymeric material is one that is commercially available from Valley Roller, of the Maxcess Group, under the product designation Val-Coat®. The material from which the second outer ring 226 is formed may also be deformable, but may have a thickness that is too small, i.e., the second outer ring 226 is too thin, or too soft, such that the second outer ring 226 does not have sufficient structural integrity to be used alone without the backing of the first outer ring 224. Each roller cover segment 220 may still further comprise a deformable coupling structure 130 located between the inner ring 122 and the first outer ring 224, see FIG. 10. The deformable coupling structure 130 may be formed from a super elastic material, such as, for example, a shape memory alloy (SMA). The SMA may comprise a nickel titanium alloy or an indium titanium alloy.

The first ply of web material W1 may pass through a first nip N1 defined between the first pressing roller 200 and the embossing roller 20. Because the second outer ring 226 of the first pressing roller 200 may be formed from a material, which is compressible, the second outer ring 226 compresses in the first nip N1 so as to conform to the embossing pattern formed on the embossing roller 20 to allow for a full or complete embossing of the first ply of web material W1 by the embossing roller 20. Further, because the first outer ring 224 is formed from a material which is deformable, and the first outer ring 224 is supported on its inner surface by the deformable coupling structure 130, a portion of the second outer ring 226 in engagement with the embossing roller 20 is capable of deforming to the shape of the embossing roller 20 to increase the length of the first nip N1 between the first pressing roller 200 and embossing roller 20, thereby increasing the time that the first ply of web material W1 is compressed in the first nip N1, i.e., the first nip N1 is extended, so as to allow for a more complete embossing of the first ply W1 by the embossing roller 20 while in the first nip N1.

Figure 11:
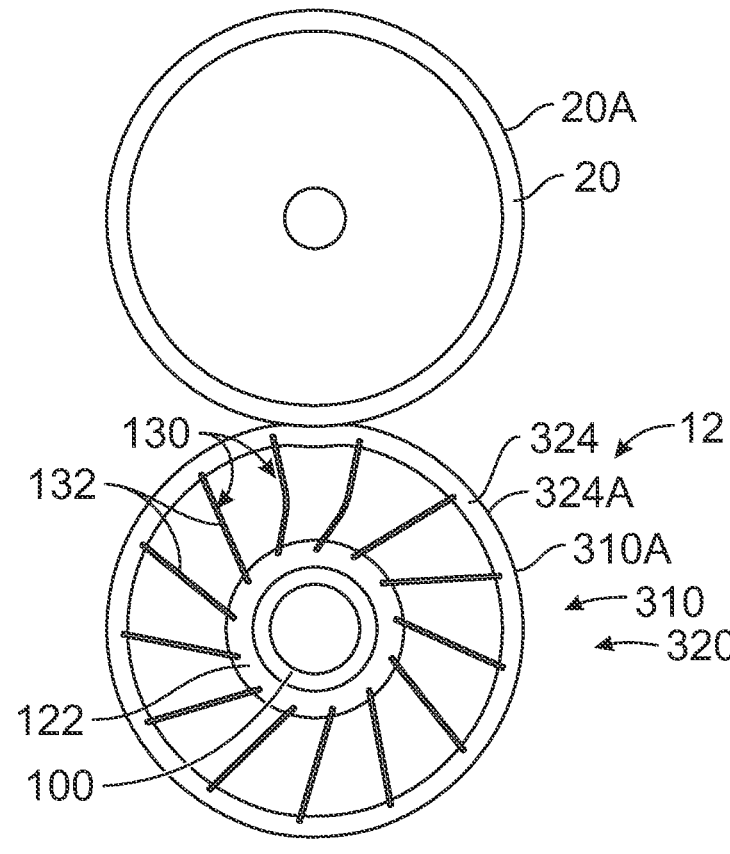
FIG. 11 illustrates the second pressing roller.

The second pressing roller 12 may be constructed in a similar manner to the first pressing roller 10 and is illustrated in FIGS. 1 and 11, where elements in the second pressing roller 12 which are the same as elements in the first pressing roller 10 of FIGS. 1 and 3A are referenced with the same reference numerals. The second pressing roller 12 includes an inner core 100 and a roller cover structure 310. The roller cover structure 310 is adapted to be mounted on the inner core 100 for rotation with the inner core 100. The roller cover structure 310 may be defined by a plurality of roller cover segments 320. Each roller cover segment 320 may comprise an inner ring 122 adapted to be fitted on the inner core 100 and may be secured to the inner core 100, such as by a friction fit, adhesive or a fastener. The inner ring 122 may be formed from a rigid material, such as steel, aluminum, a fiber composite or a hard polymeric material. Each roller cover segment 320 may further comprise an outer ring 324, having an outer surface 324A forming a portion or section of the outer surface 310A of the roller cover structure 310. The outer ring 324 may be formed from a material, which is deformable, examples of which include a deformable metal such as steel or aluminum or deformable polymeric materials, such as deformable elastomeric materials including polyurethane, nylon, a rubber or an elastomer, wherein the rubber/elastomer may have a hardness falling within the range of 0-50 Pusey and Jones hardness (P&J). One example of a deformable polymeric material is one that is commercially available from Stowe Woodward, part of the Andritz Group, under the product designation Micromate. Each roller cover segment 320 may still further comprise a deformable coupling structure 130 located between the inner ring 122 and the outer ring 324, see FIG. 11. In the illustrated embodiments, the deformable coupling structure 130 may be formed from a super elastic material, such as, for example, a shape memory alloy (SMA). The SMA may comprise a nickel titanium alloy or an indium titanium alloy.

As noted above, the second ply of web material W2 passes over the second and third guide rollers R2 and R3 and into the third nip N3, such that the second ply W2 moves generally simultaneously with the first ply W1 through the third nip N3. As the second ply of web material W2 enters the third nip N3, it engages with the first side of the first ply of web material W1 coated with adhesive. While in the third nip N3, the first and second plies of web material W1 and W2 are pressed together by the embossing roller 20 and the second pressing roller 12, which functions as a marrying roller. Because the outer ring 324 of the second pressing roller 12 is formed from a material which is deformable, and the outer ring 324 is supported on its inner surface by the deformable coupling structure 130, a portion of the outer ring 324 in engagement with the embossing roller 20 is capable of deforming to the shape of the embossing roller 20 to increase the length of the first nip N1 between the second pressing roller 12 and embossing roller 20, thereby increasing the time that the first and second plies of web material W1 are compressed in the second nip N2, i.e., the second nip N2 is extended, so as to allow for a more complete bonding between the first and second plies W1 and W2.

It is noted that the material from which the outer ring 324 is formed, while it is preferable that the material be deformable, the material may not compress easily such that its thickness remains substantially constant.

The description of the present disclosure has been presented for purposes of illustration and description, but is not intended to be exhaustive or limited only to the embodiments in the form disclosed. Many modifications and variations will be apparent to those of ordinary skill in the art without departing from the scope and spirit of the disclosure.

Having thus described embodiments of the present application in detail, it will be apparent that modifications and variations are possible without departing from the scope of the subject matter of the present disclosure defined in the appended claims.

What is claimed is:

1. A pressing roller comprising:
an inner core;
a roller cover structure adapted to be mounted on the inner core for rotation with the inner core, the roller cover structure defining an outer surface adapted to mate with an outer surface of a mating roller to define a nip to receive one or more plies of web material, the roller cover structure comprising a plurality of roller cover segments, wherein each roller cover segment comprises:
an inner ring positioned about the inner core;
an outer ring spaced from the inner ring; and
a deformable coupling structure located between the inner ring and the outer ring, wherein the deformable coupling structure is formed from one of a shape memory alloy (SMA), a carbon fiber composite, or nylon, wherein the outer ring is deformable and compressible; wherein the deformable coupling structure comprises a plurality of ribs coupled to the inner and outer rings; and
wherein each of the ribs has a thickness that varies along its length from where the rib is coupled to the inner ring to where the rib is coupled to the outer ring.

2. The pressing roller of claim 1, wherein the inner ring is formed of a rigid material.

3. The pressing roller of claim 1, wherein the outer ring-comprises an elastomeric material.

4. The pressing roller of claim 3, wherein the elastomeric material has a hardness falling within the range of 50-200 Pusey and Jones hardness (P&J).

5. The pressing roller of claim 1, wherein the outer ring-comprises a deformable polymeric material.

6. The pressing roller of claim 1, wherein the outer ring comprises a first outer ring and a second outer ring, wherein the first outer ring comprises-a deformable polymeric material or metal, and wherein the second outer ring comprises a compressible elastomeric material.

7. The pressing roller of claim 1, wherein the ribs have one of a linear, curved or angled shape.

8. The pressing roller of claim 1, wherein the thickness of each rib is greater near the inner ring than near the outer ring.

9. The pressing roller of claim 1, wherein the thickness of each rib is varied by staggering layers of SMA material of different lengths.

10. The pressing roller of claim 9, wherein the layers of SMA material are coupled together using adhesive or fasteners.

11. The pressing roller of claim 1, wherein the ribs define main ribs and the deformable coupling structure further comprises at least one sub-rib coupled to a pair of adjacent main ribs.

12. The pressing roller of claim 1, wherein the SMA is one of a nickel titanium or indium titanium.

13. The pressing roller of claim 1, wherein the deformable coupling structure is coupled to the inner ring using either interlocking joints or mechanical fasteners.

14. A pressing roller comprising:
an inner core;
a roller cover structure adapted to be mounted on the inner core for rotation with the inner core, the roller cover structure defining an outer surface adapted to mate with an outer surface of a mating roller to define a nip to receive one or more plies of web material, the roller cover structure comprising a plurality of roller cover segments, wherein each roller cover segment comprises:
an inner ring positioned about the inner core;
an outer ring spaced from the inner ring; and
a deformable coupling structure located between the inner ring and the outer ring, wherein the deformable coupling structure is formed from one of a shape memory alloy (SMA), a carbon fiber composite, or nylon, wherein the outer ring is deformable and compressible; and
wherein the deformable coupling structure comprises a lattice structure.

15. The pressing roller of claim 14, wherein the lattice structure comprises a honeycomb structure.

16. The pressing roller of claim 14, wherein the lattice structure comprises a randomly shaped lattice structure.

17. A pressing roller comprising:
an inner core;
a roller cover structure adapted to be mounted on the inner core for rotation with the inner core, the roller cover structure defining an outer surface adapted to mate with an outer surface of a mating roller to define a nip to receive one or more plies of web material, the roller cover structure comprising a plurality of roller cover segments, wherein each roller cover segment comprises:
an inner ring positioned about the inner core;
an outer ring spaced from the inner ring; and
a deformable coupling structure located between the inner ring and the outer ring, wherein the deformable coupling structure is formed from a shape memory alloy (SMA),
wherein the outer ring is deformable and compressible; and
wherein the SMA is one of nickel titanium or indium titanium.

18. A pressing roller comprising:
an inner core;
a roller cover structure adapted to be mounted on the inner core for rotation with the inner core, the roller cover structure defining an outer surface adapted to mate with an outer surface of a mating roller to define a nip to receive one or more plies of web material, the roller cover structure comprising a plurality of roller cover segments, wherein each roller cover segment comprises:
an inner ring positioned about the inner core;

an outer ring spaced from the inner ring; and a deformable coupling structure located between the inner ring and the outer ring, wherein the deformable coupling structure is formed from one of a shape memory alloy (SMA), a carbon fiber composite, or nylon, wherein the outer ring is deformable and compressible; and wherein the deformable coupling structure is coupled to the inner ring using either interlocking joints or mechanical fasteners.

* * * * *